United States Patent [19]
Wang

[11] Patent Number: 5,649,290
[45] Date of Patent: Jul. 15, 1997

[54] HANDOVER METHOD BASED UPON CHANNEL QUALITY

[75] Inventor: Robert Chuenlin Wang, Mendham Township, Morris County, N.J.

[73] Assignee: Lucent Technologies Inc., Murray Hill, N.J.

[21] Appl. No.: 355,890

[22] Filed: Dec. 14, 1994

[51] Int. Cl.$^6$ .............................. H04Q 7/00; H04Q 9/00
[52] U.S. Cl. ............................. 370/332; 455/436
[58] Field of Search ................... 455/33.1, 33.2, 455/34.1, 54.1, 54.2, 56.1, 58.2, 63, 34.2, 67.1, 67.3; 379/59, 60, 63

[56] References Cited

U.S. PATENT DOCUMENTS

| | | | |
|---|---|---|---|
| 5,001,742 | 3/1991 | Wang | 379/60 |
| 5,081,671 | 1/1992 | Raith et al. | 379/60 |
| 5,189,734 | 2/1993 | Bailey et al. | 455/33.2 |
| 5,204,970 | 4/1993 | Stengel et al. | 455/69 |
| 5,257,401 | 10/1993 | Dahlin et al. | 455/33.2 |
| 5,265,263 | 11/1993 | Ramsdale et al. | 455/33.2 |
| 5,317,623 | 5/1994 | Sakamoto et al. | 379/59 |
| 5,475,870 | 12/1995 | Weaver, Jr. et al. | 455/67.1 |

Primary Examiner—Edward F. Urban
Assistant Examiner—Gertrude Arthur

[57] ABSTRACT

A method is disclosed for executing handovers in a cellular network, based upon channel quality measurements. For AMPS service, the method involves the monitoring of a supervisory audio tone (SAT) signal which is superimposed on the voice signal that is transmitted between base stations and mobile terminals traveling within a cellular network, and handovers are executed in dependence upon noise power measurements associated therewith. For TDMA service, the method involves the monitoring of a raw data signal associated with digital transmissions, and handovers are executed in dependence upon noise power measurements associated therewith.

7 Claims, 3 Drawing Sheets

HANDOVER METHOD BASED UPON CHANNEL QUALITY

BACKGROUND OF THE INVENTION

1. Field of the Invention

The subject invention relates to mobile cellular networks, and more particularly, to a handover scheme based upon channel quality measurements.

2. Description of the Related Art

A mobile cellular network is a radio system which provides radio communication for mobile terminals over a large geographical area. Cellular networks generally consist of a plurality of base stations arranged in a systematic pattern throughout a geographical area to define a plurality of adjoining cells of between 2 and 20 kilometers in radius.

Typically, a mobile terminal in a particular cell communicates through a radio channel provided by the base station of that cell. When a mobile terminal is traveling between adjacent cells of a network, a handover must be performed whereby the mobile terminal terminates communication with the base station of one cell and initiates communication with the base station of another cell.

Techniques for effecting handovers in cellular networks are known in the art. A common technique involves the continuous measurement of the strength of voice signals. Usually, the RF (radio frequency) signal strength of mobile communications within a particular cellular network are monitored by a system controller. When the RF signal strength of a particular mobile communication falls below an acceptable level, the system controller will initiate a handover from one base station to another. Such a handover method is effective in noise-limited cellular systems. However, in interference-limited systems wherein noise is prevalent, received signal strength measurements can be distorted by interference from adjacent channels or co-channel radio signals. It would be beneficial therefore, to provide a handover procedure that is unaffected by noise and/or channel interference.

SUMMARY OF THE INVENTION

The subject invention is directed to a method by which mobile cellular radio transmissions are handed over from one cell to another in dependence upon channel quality measurements. In one embodiment of the subject invention, the method is employed in an advanced mobile phone service (AMPS) and involves monitoring the quality of a received supervisory audio tone (SAT) signal which is superimposed on the voice signal transmitted between base stations and mobile terminals. The SAT signal is generated by a baseband signal processing unit associated with the base station in each cell of a cellular network and is transponded by the mobile terminal. An example of a baseband processing unit is disclosed in commonly assigned U.S. Pat. No. 5,001,742, the disclosure of which is herein incorporated by reference.

For AMPS service, during an ongoing mobile radio transmission, the base station in communication with a mobile terminal continuously measures the signal power and noise power of the received baseband SAT signal and computes the ratio therebetween. If the base station determines that the SAT signal power to SAT noise power ratio is below a prescribed threshold established in accordance with a minimal level of channel quality, a locate request is initiated, causing each neighboring base station to measure the SAT signal power to SAT noise power ratio with respect to the mobile terminal.

The cell having the highest SAT signal power to SAT noise power ratio is selected as the target cell for supporting the ongoing radio transmission. Once the target cell has been selected, the next step is to select the best idle radio channel or frequency to receive the ongoing communication when it is handed over. To do so, the SAT noise power of each idle channel in the target cell is measured, and the idle channel with the highest SAT noise power is selected to receive the ongoing radio transmission of the mobile terminal.

In another embodiment of the subject invention, the method of channel allocation is in accordance with a time division multiple access (TDMA) system and includes the steps of calculating the raw data signal power to raw data noise power ratio for an ongoing digital transmission between a mobile terminal and a base station during a synchronization word interval, and determining whether this ratio is below a predetermined threshold value. If the ratio falls below an acceptable level, a locate request is initiated, causing each base station adjacent to the base station in communication with the mobile terminal to determine the raw data signal power to raw data noise power ratio for the mobile terminal. The adjacent cell having the highest determined raw data signal power to raw data noise power ratio is selected as a target cell for supporting the ongoing radio transmission when it is handed over. Then, the idle channel within the target cell having the highest raw data noise power is selected to receive the radio transmission.

Further features of the method of the subject invention will become more readily apparent to those skilled in the art to which the subject invention appertains from the following detailed description of the preferred embodiments taken in conjunction with the drawings.

BRIEF DESCRIPTION OF THE DRAWINGS

To better understand how to practice the method of the present invention, preferred embodiments will be described in detail with reference to the drawings wherein.

DETAILED DESCRIPTION OF THE PREFERRED EMBODIMENTS

Figure 1:
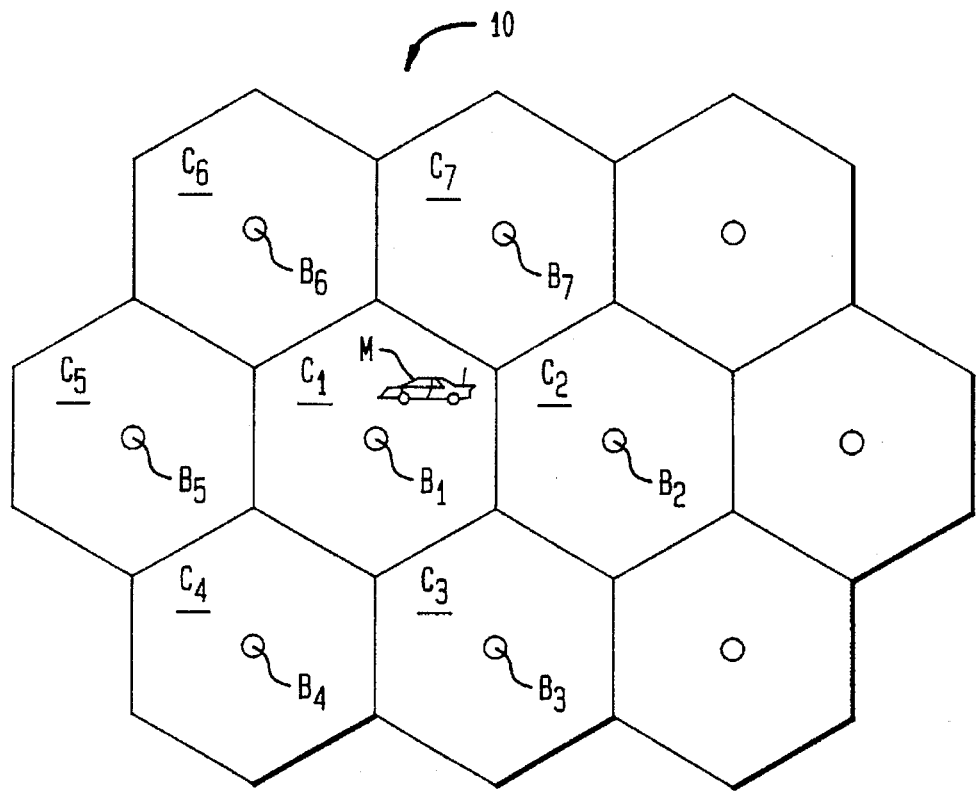
FIG. 1 is a schematic illustration of a cellular network consisting of a plurality of adjoining cells each having a base station.
Figure 2:
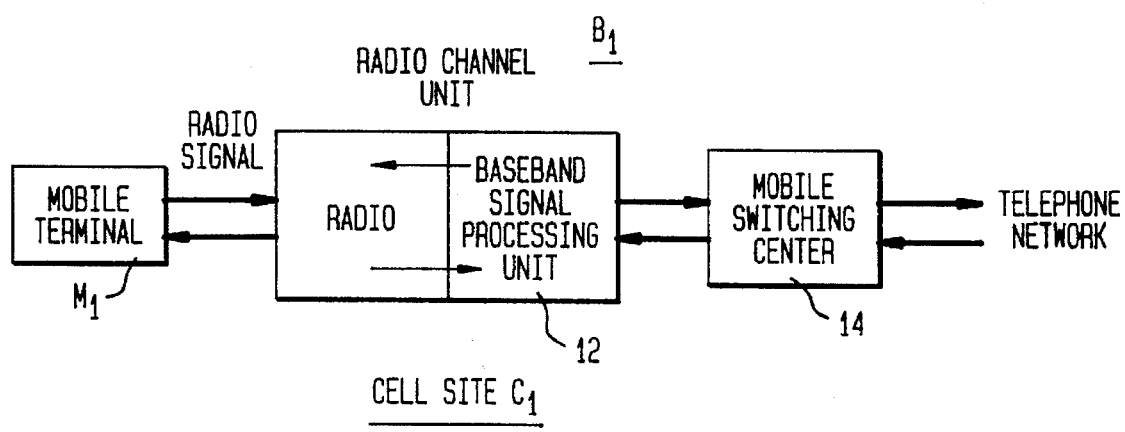
FIG. 2 is a schematic illustration of a cell site within the cellular network of FIG. 1.

Referring now to the drawings wherein like reference numeral identify similar elements of the subject invention, there is illustrated in FIG. 1 a cellular network 10 consisting of a plurality of adjoining cells including, among others, cells $C_1$ through $C_7$. Each cell in cellular network 10 has a base station located therein. The base stations are referred to as $B_1$ through $B_7$, and as depicted in FIG. 2, each base station is located at a cell site having associated therewith a baseband signal processing unit 12.

In accordance with the present invention, for AMPS service each baseband signal processing unit 12 is configured to monitor a supervisory audio tone (SAT) signal which is superimposed on the voice signal transmitted from a mobile terminal traveling within the cellular network. More particularly, the baseband signal processing units measure the received SAT signal power ($SAT_{SP}$) and SAT noise power ($SAT_{NP}$) for ongoing mobile radio transmissions, and utilize these measurements as a basis for executing handovers in conjunction with a mobile switching center 14.

Figure 3:
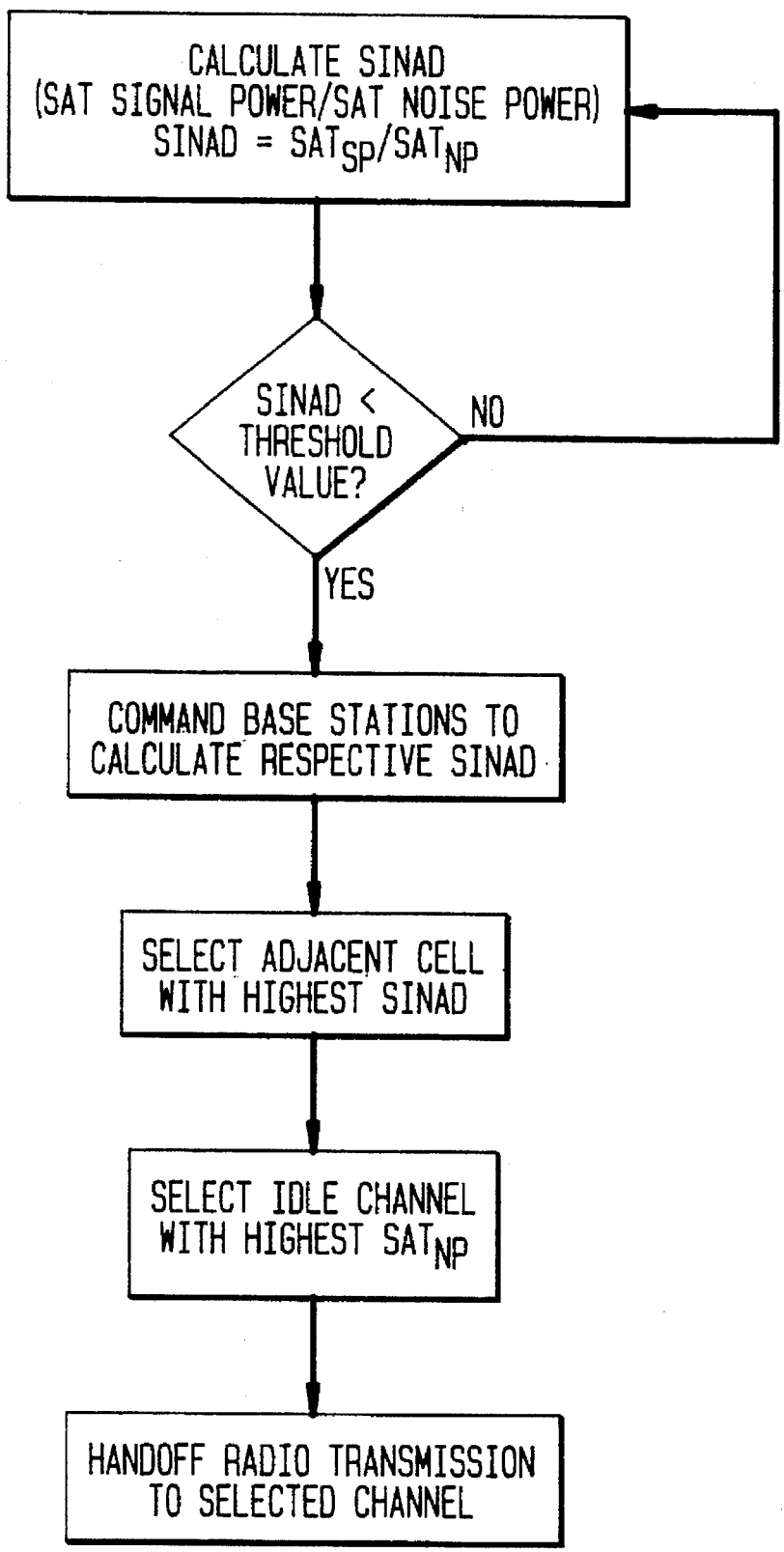
FIG. 3 is a flow chart illustrating the steps of the handover method of the subject invention for an AMPS (FM) radio system.

Referring again to FIG. 1, mobile terminal $M_1$ is illustrated and is traveling within cell $C_1$ in communication with base station $B_1$. In accordance with the subject invention, the ongoing radio transmission of mobile terminal $M_1$ has a SAT signal superimposed thereupon which is generated by the baseband processing unit associated with base station $B_1$ and transponded by the mobile terminal. Referring to FIG. 3, during the radio transmission, base station $B_1$ continuously measures the $SAT_{SP}$ and $SAT_{NP}$ of the received baseband SAT signal, and evaluates the ratio therebetween (the SINAD or Signal to Noise and Distortion ratio). If the SINAD ratio falls below a predetermined threshold value, a locate command is broadcast from base station $B_1$ to each of the base stations adjacent thereto, namely base stations $B_2$ through $B_7$, causing the baseband signal processing unit associated with each of those base stations to determine the SINAD ratio for mobile terminal $M_1$ with respect to their cell. The base station which calculates the highest SINAD ratio for mobile terminal $M_1$, for example, cell $C_2$, is selected as the target cell which will support the ongoing radio transmission of mobile terminal $M_1$ when it is handed over. Such a determination is based upon the quality (i.e., noise, distortion and/or interference) of the received baseband signal, as opposed to the received radio signal strength. Moreover, since at the SAT signal power level, $SAT_{SP}$ is substantially constant, the SINAD ratio will vary in dependence upon variations or fluctuations in the $SAT_{NP}$. Thus, a high SINAD ratio will be indicative of a low $SAT_{NP}$, and hence a clear, noise-free radio transmission. Conversely, a low SINAD ratio, will be indicative of a high $SAT_{NP}$, and hence a distorted, noisy radio transmission.

Once the target cell has been selected based upon channel quality, an idle channel within that cell is selected to receive the radio transmission of the mobile terminal (use herein of the term "idle channel" shall be interchangeable with the terms "idle radio" or "idle frequency"). The selection is made by determining which idle channel within the target cell has the highest $SAT_{NP}$. It is this channel that has the least interference and is least likely to be carrying an ongoing radio transmission of another mobile terminal. Conversely, since distortion of the baseband signal will be suppressed by a strong carrier signal, low SAT noise power on a particular channel within the target cell will indicate the presence of a strong carrier signal, and thus the presence of an ongoing radio transmission of another mobile terminal.

Once the desired idle channel has been selected within the target cell, the baseband processing unit in communication with the mobile terminal will inform mobile switching center 14 to hand over the transmission of mobile terminal $M_1$ from the base station in cell $C_1$ to the base station in cell $C_2$. At such a time, mobile terminal $M_1$ will terminate communication with base station $B_1$ and will initiate communication with base station $B_2$. This method of quality based channel selection will serve to improve voice quality and reduce the number of lost calls. Channel quality based measurements of baseband signals can also serve to diagnose and monitor hardware degradation within a cellular network, to monitor the performance of the system and to re-engineer the system.

Although the method of the subject invention is described above with respect to AMPS (FM) systems, it is to be appreciated that the subject invention is applicable to other RF communication schemes such as Time Divisional Multiple Access (TDMA) systems. In TDMA systems, wherein communications are transmitted on the basis of non-overlapping time sequenced data bursts, the received raw data signal power to raw data noise power ratio during the synchronization word interval are used as measures of channel quality and as a basis for the execution of handovers. More specifically, the raw data noise power is used to select the best idle radio channel within a target cell.

Figure 4:
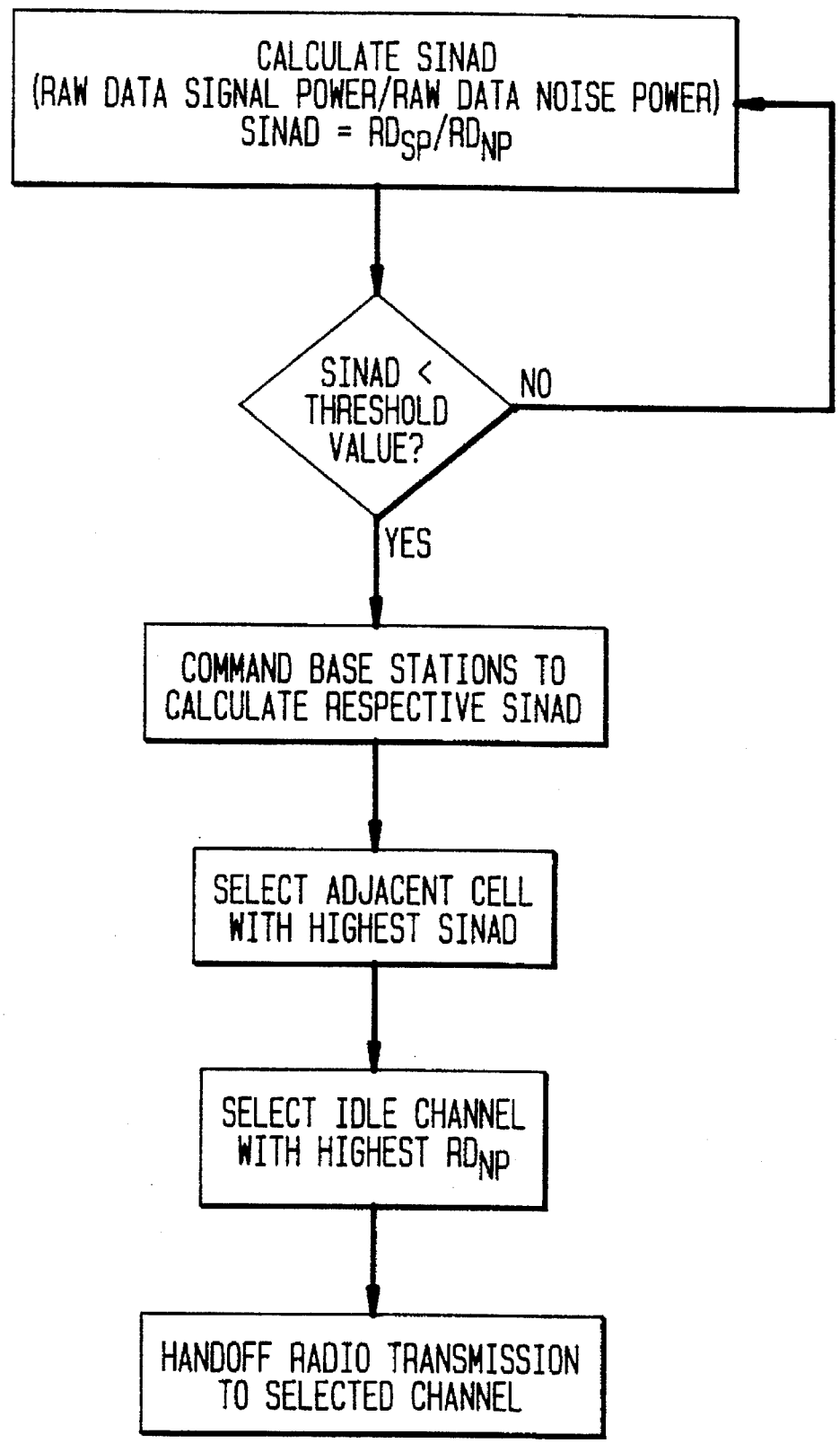
FIG. 4 is a flow chart illustrating the steps of the handover method of the subject invention for a TDMA system.

Referring to FIG. 4, in operation, a base station in communication with a mobile terminal continuously calculates the SINAD ratio between the raw data signal power $RD_{SP}$ and raw data noise power $RD_{NP}$ of the data signal transmitted between a base station and a mobile terminal. If the SINAD ratio falls below a predetermined threshold value, a locate command is transmitted from the communicating base station to each of the base stations adjacent thereto. Then, each of the adjacent base stations compute the SINAD ratio for the mobile terminal with respect to their cell, and the cell with the highest measurement is selected as the target cell which will support the ongoing radio transmission when it is handed off. Thereafter, the idle channel within the selected target cell which has the highest raw data noise power is selected to receive the ongoing transmission of the mobile terminal, and the transmission is handed off to that channel.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A method for handing over an ongoing radio transmission of a mobile terminal traveling within a cellular network, said network having a plurality of adjoining cells each having a base station, and a multiplicity of channels, comprising the steps of:

handing over the ongoing radio transmission of a mobile terminal traveling in one of said plurality of cells to an idle channel in a target adjacent cell, said handing over including:

(i) determining whether to commence a handover in dependence upon at least a baseband noise power level measured by the base station in said one cell; and (ii) selecting said target adjacent cell based upon a measurement of the baseband noise power of a supervisory audio tone (SAT) signal superimposed on a voice signal received by ones of a plurality of baseband signal processing units each associated with one of said base stations in the cellular network.

2. A method according to claim 2, wherein said step of handing over an ongoing radio transmission of a mobile terminal includes the step of selecting an idle channel having the highest baseband SAT noise power level in a selected target cell.

3. A method for handing over an ongoing radio transmission of a mobile terminal traveling within a cellular network, said network having a plurality of adjoining cells each having a base station, and a multiplicity of channels, comprising the steps of:

handing over the ongoing radio transmission of a mobile terminal traveling in one of said plurality of cells to an idle channel in an adjacent cell, said handing over including the step of measuring at least a baseband raw data noise power level associated with a digital voice/ data signal generated in a time divisional multiple access (TDMA) system, said measuring being performed by the base station of said one cell to determine whether to hand over said radio transmission.

4. A method according to claim 3, wherein said step of handing over an ongoing radio transmission further involves a measurement of raw data signal power and wherein said raw data signal power and said raw data noise power are measured during a synchronization word interval in said TDMA system.

5. A method for handing over an ongoing radio transmission of a mobile terminal traveling within a cellular network, said network having a plurality of adjoining cells each having a base station, and a multiplicity of channels, comprising the steps of:

handing over the ongoing radio transmission of a mobile terminal traveling in one of said plurality of cells to an idle channel in an adjacent cell, said handing over including the step of measuring at least a raw data noise power associated with a digital voice/data signal generated in a time divisional multiple access (TDMA) system, said measuring being performed by the base station of said one cell to determine whether to hand over said radio transmission, and said handing over further including the step of selecting an idle channel having the highest raw data noise power level in a selected target cell.

6. A method of allocating channels to mobile terminals traveling within a cellular network having a plurality of adjoining cells, each of said cells having therein a base station and a multiplicity of channels for call allocation, each base station having a signal processing unit for generating and monitoring a baseband voice/data signal having a supervisory audio tone (SAT) superimposed thereon, said method comprising the steps of:

a) calculating the SAT signal power to SAT noise power ratio for an ongoing radio transmission between a mobile terminal and a base station;

b) determining whether the ratio between the SAT signal power and the SAT noise power is below a predetermined threshold value;

c) commanding each base station adjacent to the base station in communication with the mobile terminal to determine the SAT signal power to SAT noise power ratio for the mobile terminal;

d) selecting the adjacent cell having the highest determined SAT signal power to SAT noise power ratio as a target cell for receiving the ongoing radio transmission;

e) selecting an idle channel within the target cell having the highest SAT noise power; and f) handing-over the ongoing radio transmission to the selected idle channel within the target cell.

7. A method of allocating channels to mobile terminals travelling within a cellular network having a plurality of adjoining cells, each of said cells having therein a base station and a multiplicity of channels for call allocation, each mobile terminal configured to transmit a digital voice/data signal in accordance with a time division multiple access system, the method comprising the steps of:

a) calculating the raw data signal power to raw data noise power ratio for an ongoing digital transmission between a mobile terminal and a base station during a synchronization word interval;

b) determining whether the raw data signal power to raw data noise power ratio is below a predetermined threshold value;

c) commanding each base station adjacent to the base station in communication with the mobile terminal to determine the raw data signal power to raw data noise power ratio for the mobile terminal;

d) selecting an adjacent cell having the highest determined raw data signal power to raw data noise power ratio as a target cell for receiving the ongoing radio transmission;

e) selecting an idle channel within the target cell having the highest raw data noise power; and f) handing-over the ongoing radio transmission to the selected idle channel within the target cell.

* * * * *